(12) United States Patent
Martino

(10) Patent No.: US 12,137,670 B2
(45) Date of Patent: Nov. 12, 2024

(54) DOG BONE SHAPED PROJECTILE AND SLINGSHOT

(71) Applicant: Marc Gregory Martino, Westlake Village, CA (US)

(72) Inventor: Marc Gregory Martino, Westlake Village, CA (US)

( * ) Notice: Subject to any disclaimer, the term of this patent is extended or adjusted under 35 U.S.C. 154(b) by 685 days.

(21) Appl. No.: 16/948,209

(22) Filed: Sep. 9, 2020

(65) Prior Publication Data
US 2021/0068370 A1    Mar. 11, 2021

Related U.S. Application Data

(60) Provisional application No. 62/897,835, filed on Sep. 9, 2019.

(51) Int. Cl.
*A01K 15/02* (2006.01)
*F41B 3/02* (2006.01)
*F42B 6/00* (2006.01)

(52) U.S. Cl.
CPC .............. *A01K 15/025* (2013.01); *F41B 3/02* (2013.01); *F42B 6/00* (2013.01)

(58) Field of Classification Search
CPC ....... A01K 15/025; F41B 3/02; F41B 5/1484; F41B 5/0094; F42B 6/00; F42B 6/02; A63B 43/002; A63B 69/407; A63F 9/0269; A63F 2009/0282
USPC ........... 446/63, 491; 119/707; 473/586, 578, 473/613, 580
See application file for complete search history.

(56) References Cited

U.S. PATENT DOCUMENTS

| | | | | |
|---|---|---|---|---|
| 33,089 A | * | 8/1861 | Ketchum | F42B 10/44 102/385 |
| 65,376 A | * | 6/1867 | Griffin | F41B 3/02 124/20.3 |
| 225,510 A | * | 3/1880 | Curtis | F41B 3/02 124/20.3 |
| 257,379 A | * | 5/1882 | Pohlman et al. | F41B 3/02 124/20.1 |
| 1,153,415 A | * | 9/1915 | Beaty | F41B 5/14 124/16 |

(Continued)

FOREIGN PATENT DOCUMENTS

| | | | | |
|---|---|---|---|---|
| EP | 3227626 B1 | * | 3/2019 | F41B 3/02 |
| GB | 2428172 A | * | 1/2007 | A01K 97/02 |

OTHER PUBLICATIONS

"Dog bone shapes" searched via Google (Year: 2024).*

*Primary Examiner* — Morgan T Jordan
(74) *Attorney, Agent, or Firm* — Orbit IP

(57) ABSTRACT

A dog toy includes a projectile and a slingshot. The projectile is configured to fly through the air while resembling a dog bone. Accordingly, the projectile has a first and second visual pair of bulbous portions disposed at the leading and trailing ends. The trailing end is also shaped as fins for stability in flight, whereas the leading end is heavier in mass. A pair of hooks are at the leading end. A finger grip is attached near, to or formed as part of the trailing end and allows a user to grip the projectile with a user's fingers. The slingshot includes a handle configured to be gripped by the user. A pair of prongs extend from a handle top and form an opening. An elastic band is connected to each prong. A hand guard protects a portion of the user's hand during use.

19 Claims, 6 Drawing Sheets

(56) References Cited

U.S. PATENT DOCUMENTS

| | | | |
|---|---|---|---|
| 1,748,651 A * | 2/1930 | Holliday | F41B 3/02 124/24.1 |
| 1,831,230 A * | 11/1931 | Copas | F41B 3/02 473/585 |
| 2,118,166 A * | 5/1938 | Clark | F42B 6/00 446/61 |
| 2,282,764 A * | 5/1942 | Lazzari | F41B 3/02 124/26 |
| 2,302,845 A * | 11/1942 | Emerson | A63B 67/187 D21/711 |
| 2,433,412 A * | 12/1947 | Wilson | B29C 33/00 425/510 |
| 2,748,529 A * | 6/1956 | Swan | F41B 3/02 446/52 |
| 2,882,055 A * | 4/1959 | Meyer | F42B 6/06 473/586 |
| 5,747,725 A * | 5/1998 | Stewart | F42B 14/061 102/521 |
| 6,076,829 A * | 6/2000 | Oblack | A63B 60/34 473/509 |
| 6,220,918 B1 * | 4/2001 | Laronge | A63B 65/00 473/585 |
| 6,247,990 B1 * | 6/2001 | Moorhouse | A63H 27/007 446/64 |
| 7,037,164 B2 * | 5/2006 | Silverglate | A63H 27/14 124/16 |
| 7,059,314 B1 * | 6/2006 | Teague | F41B 3/02 124/20.3 |
| 9,392,768 B1 * | 7/2016 | Mullin | F41B 3/04 |
| 10,028,487 B1 * | 7/2018 | Diskin | A01K 15/025 |
| 2003/0027672 A1 * | 2/2003 | Leal | A63B 43/00 473/613 |
| 2005/0229910 A1 * | 10/2005 | Williamson | A01K 15/02 124/20.1 |
| 2006/0025254 A1 * | 2/2006 | Myers | A63B 43/06 473/613 |
| 2006/0128253 A1 * | 6/2006 | Silverglate | A63H 33/18 446/63 |
| 2006/0225667 A1 * | 10/2006 | Handelsman | A01K 15/026 119/710 |
| 2009/0011870 A1 * | 1/2009 | Neal | A63B 69/40 473/613 |
| 2010/0016470 A1 * | 1/2010 | Bastioli | C08L 3/02 523/128 |
| 2012/0125266 A1 * | 5/2012 | Ying | F41B 3/02 119/707 |
| 2012/0160224 A1 * | 6/2012 | Walterscheid | F41B 5/12 124/20.1 |
| 2013/0167819 A1 * | 7/2013 | Walterscheid | F41B 3/02 124/20.1 |
| 2014/0000577 A1 * | 1/2014 | Cummings | F41B 7/08 124/20.1 |
| 2015/0119174 A1 * | 4/2015 | Cummings | A63H 33/18 473/585 |
| 2015/0367545 A1 * | 12/2015 | Berg | B29C 45/2628 428/36.9 |
| 2016/0303459 A1 * | 10/2016 | Martino | F41B 3/02 |

* cited by examiner

DOG BONE SHAPED PROJECTILE AND SLINGSHOT

CROSS-REFERENCE TO RELATED APPLICATIONS

This non-provisional patent application claims priority to provisional application 62/897,835 filed on Sep. 9, 2019, the contents of which are fully incorporated herein with this reference.

DESCRIPTION

Field of the Invention

The present invention generally relates to dog toys. More particularly, the present invention relates to a dog bone shaped projectile that is to be shot by a slingshot such that a dog can play fetch with an owner.

Background of the Invention

This application incorporates in full the following applications: Ser. No. 15/130,161 filed on Apr. 15, 2016, which itself claimed priority to provisional application 62/147,604 filed on Apr. 15, 2015; provisional application 62/149,500 filed on Apr. 17, 2015; and provisional application 62/151,845 filed on Apr. 23, 2015.

Pet toys are a huge industry as owners are always looking for new and fun ways to play with their pets. Commonly dog owners can throw a ball such that the dog can chase and fetch the ball for repeated play. To aid the owner in throwing the ball, some companies have developed extended throwing devices that loosely grip the ball at one end while allowing the owner to hold the other end at an increased distance. When the owner goes through a throwing motion, the ball is accelerated at a very fast rate thus allowing the owner to propel the ball even further than without the device. Additionally, the owner doesn't have to touch the ball which can get quite slobbery from repeated play with a dog.

However, until this teaching, no one has tried to combine the fun of shooting a slingshot with such a dog toy. Furthermore, no one has realized that a rocket-like or arrow-like projectile can be devised to be shot from the slingshot where the projectile is dog bone shaped. Accordingly, the applicant realized a need existed for a novel and unique play pattern combining a slingshot and dog retrieval toys. The present invention fulfills these needs and provides other related advantages.

SUMMARY OF THE INVENTION

An exemplary embodiment of the present invention is a dog toy, comprising a projectile and a slingshot. The projectile comprises: a leading portion attached by a longitudinal extension to a trailing portion, wherein the projectile is configured to fly through an air space with the leading portion flying first and then followed by the trailing portion; a first hook disposed opposite a second hook about a longitudinal axis, the longitudinal axis defined along the longitudinal extension, wherein the first hook and second hook are attached near, to or formed as part of the leading portion, wherein an open portion of each hook is configured to receive an elastic band within the open portion, wherein the open portion is facing open towards the trailing portion; a finger grip attached near, to or formed as part of the trailing portion, the finger grip configured to allow a user to grip the projectile with a user's fingers; wherein the projectile is dog bone shaped having a first visual pair of bulbous portions disposed at the leading portion and a second visual pair of bulbous portions disposed at the trailing portion, wherein the longitudinal extension connects the first and second visual pair of bulbous portions. The slingshot associated with the projectile is configured to launch the projectile through the air space a distance away from the user. The slingshot comprises: a handle configured to be gripped by the user; a pair of prongs connected and/or extending from a top of the handle, wherein the pair of prongs form an opening wherein the opening is at least as wide as a maximum width of the projectile; at least one elastic band connected to each prong of the pair of prongs; wherein each at least one elastic band is releasably captured by its respective first or second hook of the projectile during launching by the user.

In other exemplary embodiments, the first visual pair of bulbous portions may be heavier in weight in comparison to the second visual pair of bulbous portions.

The second visual pair of bulbous portions may be formed as aerodynamic stabilization fins. The aerodynamic stabilization fins may comprise at least two fins, at least three fins, or at least four fins. Each of the at least four fins may be disposed perpendicular to their respective adjacent fins.

The aerodynamic stabilization fins may comprise a twisted shape configured to induce a spin of the projectile after launching.

A center of gravity of the projectile may be closer to the leading portion in comparison to the trailing portion.

The projectile may be integrally formed as one part.

The projectile may comprise an elastomeric polymer, a thermoplastic elastomer or a thermoplastic rubber.

An overall weight of the projectile may be less than 100 grams and more than 25 grams.

The slingshot may include a hand guard configured to at least partially cover a portion of a user's hand when the user is holding the handle, the hand guard being disposed between the user's hand and the projectile when the projectile being pulled back and is stretching the at least one elastic bands before being launched through the air space.

The hand guard may be adjustably positioned to the slingshot at a multitude of positions relative to the handle configured to enable the user to maximize the amount of the user's hand being protected by the hard guard.

The projectile may be made from a two-part mold that does not include any pulls.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
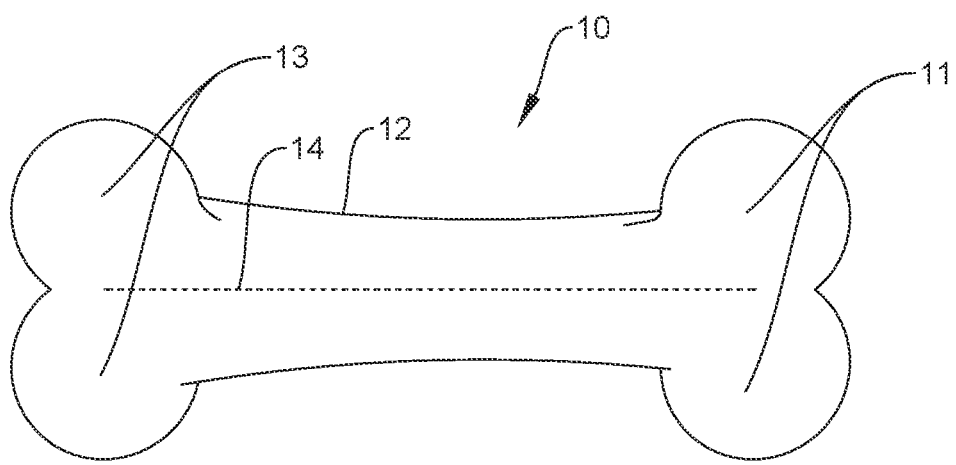
FIG. 1 is a simplistic representation of a dog bone commonly known to most dog owners.
Figure 2:
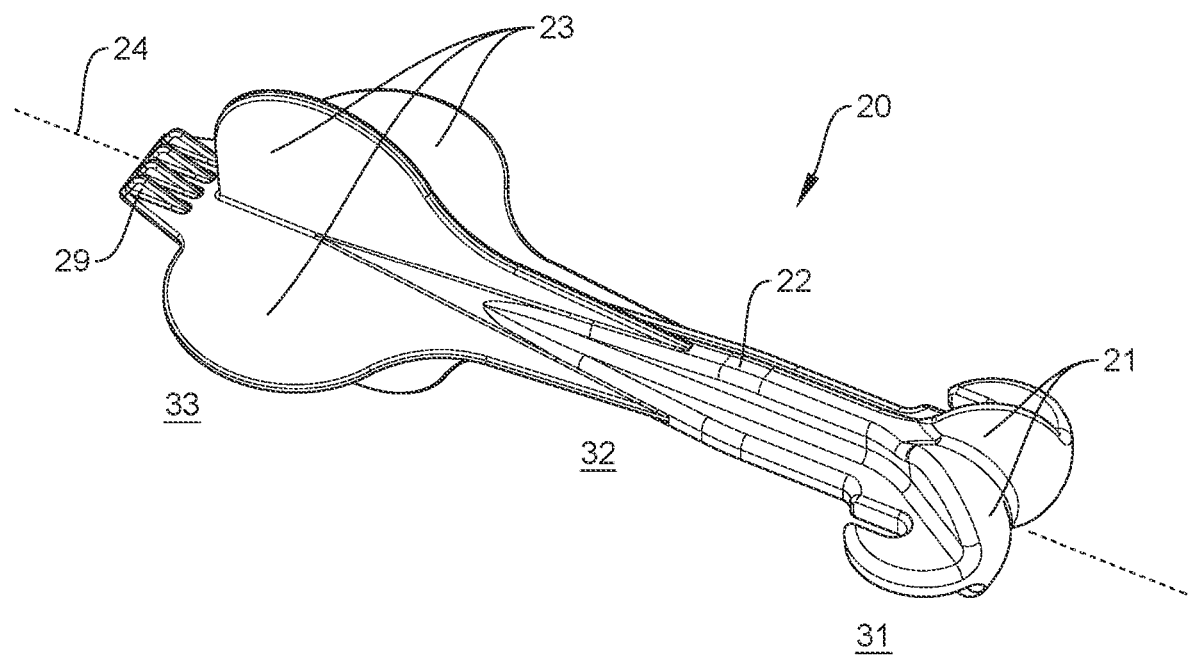
FIG. 2 is an isometric view of an embodiment of a dog bone shaped projectile of the present invention.

FIG. 1 is a simplistic graphical representation of a dog bone 10 commonly known to most dog owners and most people in general. As can be appreciated, the shape of the dog bone has a very distinctive shape which can be described as a first pair of bulbous portions 11 connected by a longitudinal extension 12 to a second pair of bulbous portions 13, wherein each pair of bulbous portions are oppositely disposed about a longitudinal axis 14. The dog bone shape is very recognizable, as almost all cartoon representations or images of dog bones follow this pattern.

FIGS. 2-6 show an embodiment of a projectile 20 of the present invention that combines both attributes of the dog bone 10 and an arrow/rocket-like structure that can be shot from a slingshot. The projectile 20 can be defined as having a leading portion 31 attached by a middle portion 32 (longitudinal extension 22) to a trailing portion 33, where the projectile is configured to fly through an air space with the leading portion flying first and then followed by the trailing portion.

A first hook 25 is disposed opposite a second hook 26 about a longitudinal axis 24. The longitudinal axis 24 is defined extending along the longitudinal extension 22. The first hook and second hook are attached near, to or formed as part of the leading portion. Each hook has an open portion 27, 28. For example, the first hook 25 has an open portion 27. Likewise, the second hook 26 has an open portion 28. Each hook is configured to receive an elastic band within the open portion. To facilitate easy release of the elastic band, each open portion is facing open towards the trailing portion.

A finger grip 29 is attached near, to or formed as part of the trailing portion. The finger grip is configured to allow a user to grip the projectile with a user's fingers.

As can be seen, the projectile is dog bone shaped having a first visual pair of bulbous portions 21 disposed at the leading portion and a second visual pair of bulbous portions 23 disposed at the trailing portion. Then, the longitudinal extension 22 connects the first and second visual pair of bulbous portions such that the dog bone shape is created.

When a user views the projectile 20, they can still recognize the dog bone shape embodied therein. Therefore, the bulbous portions have a visual effect of creating a bulbous appearance while in reality the amount of material may be very thin. For example, the first visual pair of bulbous portions 21 are heavier in weight and volume in comparison to the second visual pair of bulbous portions 23. The first visual pair of bulbous portions 21 have a lot of mass such that a large portion of the weight is disposed at the front 31 of the projectile. Then, as you move to the rear 33 of the projectile, the second visual pair of bulbous portions 23 are formed very thin such that they function as aerodynamic stabilization fins. It is understood that two fins could have been used, three fins could have been used, or as shown herein four fins can be used. In the embodiment shown, the four fins 23 are disposed perpendicular to their respective adjacent fins.

Additionally, not shown, the aerodynamic stabilization fins could include a twisted shape which is configured to induce a spin of the projectile after launching for increased stability and accuracy in flight.

Figure 3:
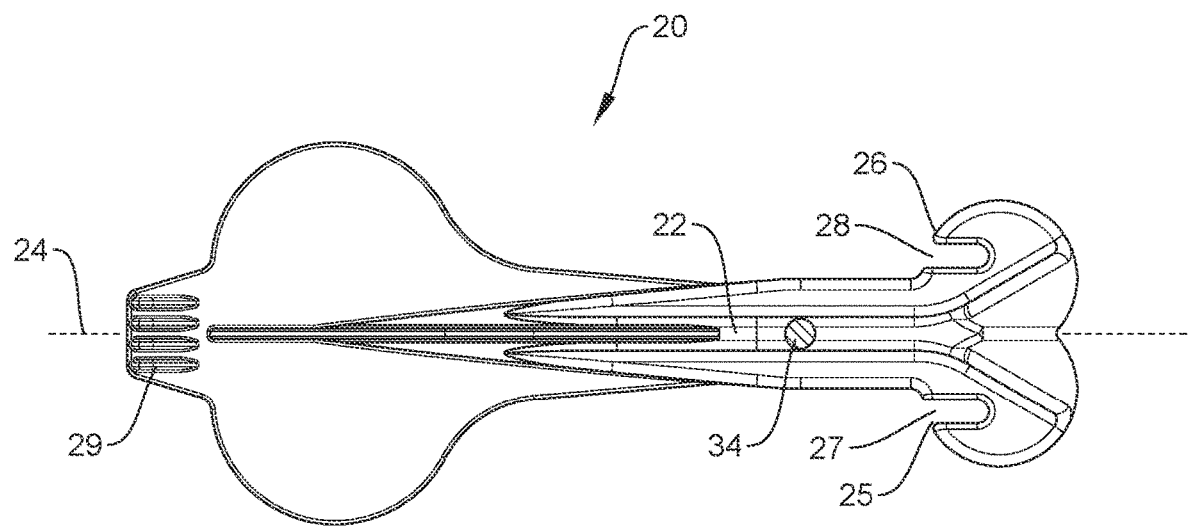
FIG. 3 is a top view of the structure of FIG. 2.
Figure 4:
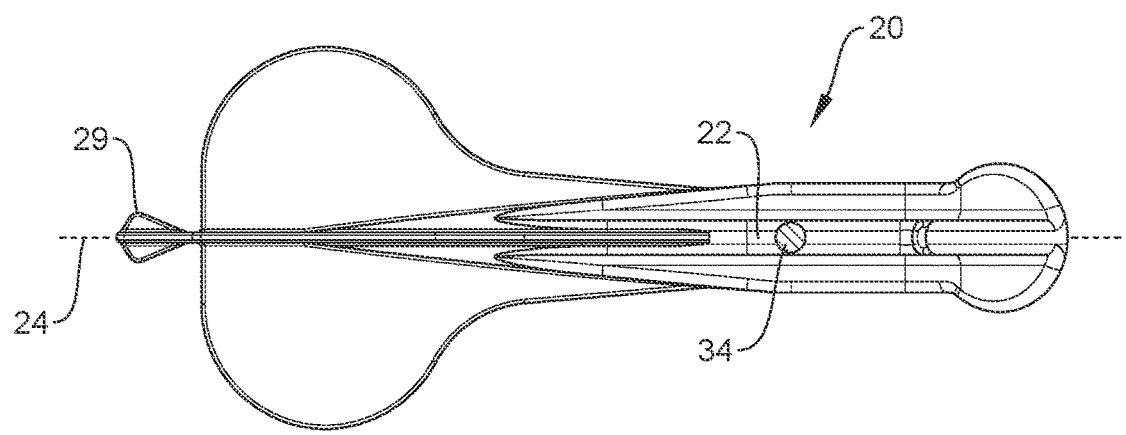
FIG. 4 is a side view of the structure of FIG. 2.
Figure 5:
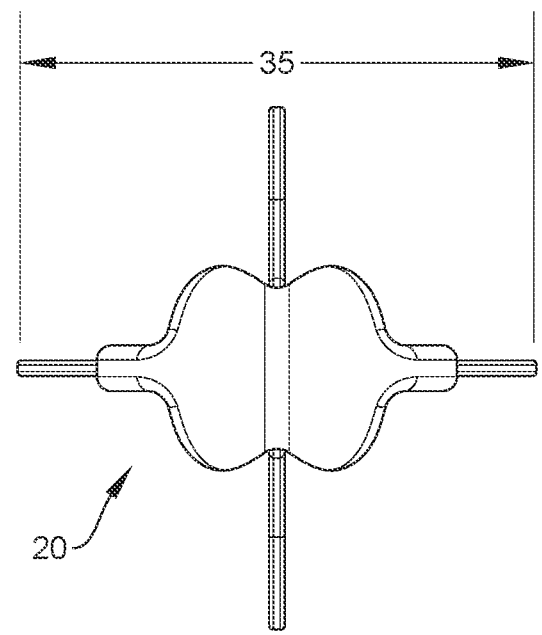
FIG. 5 is a front view of the structure of FIG. 2.
Figure 6:
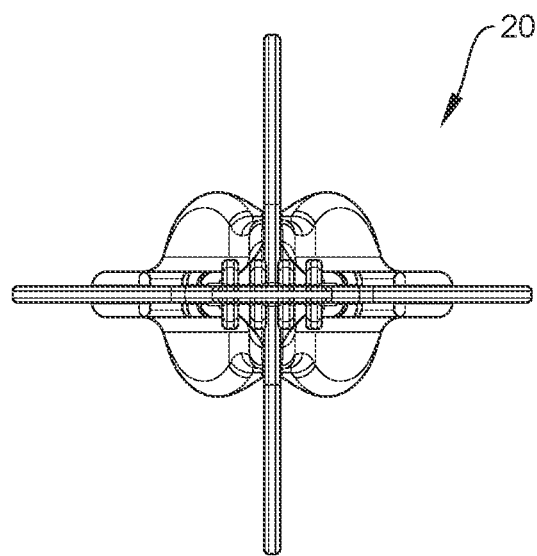
FIG. 6 is a rear view of the structure of FIG. 2.
Figure 7:
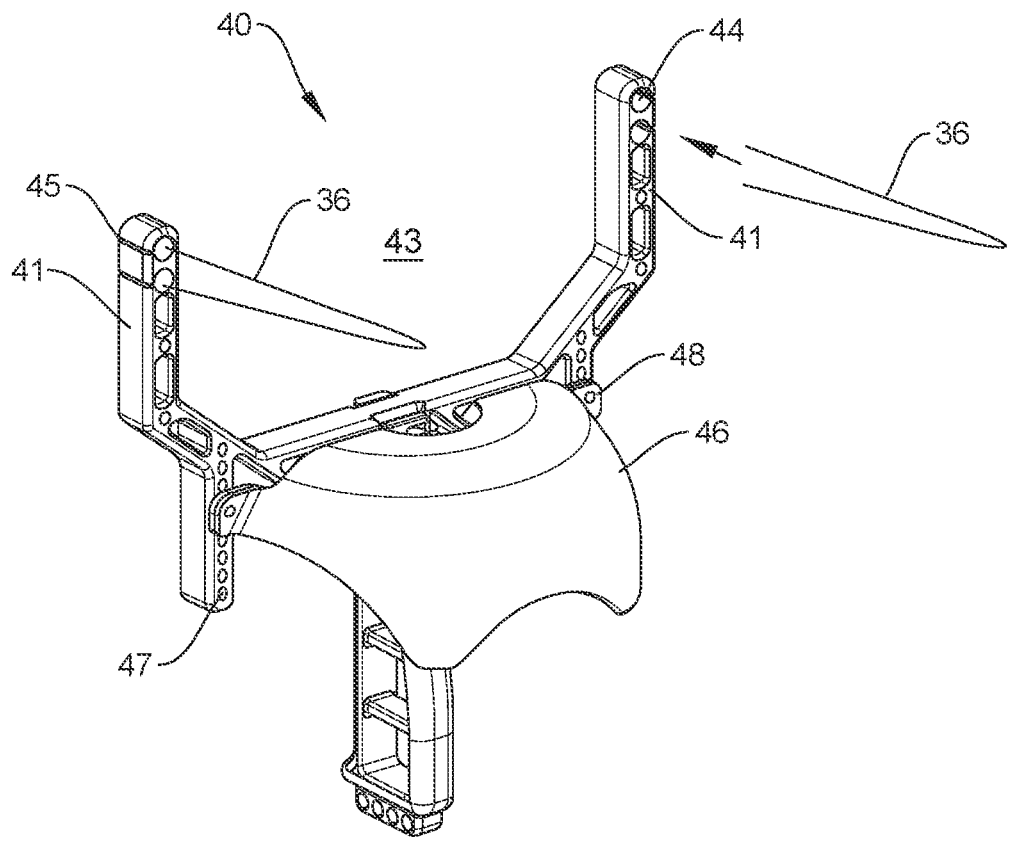
FIG. 7 is an isometric view of an embodiment of a slingshot of the present invention.
Figure 8:
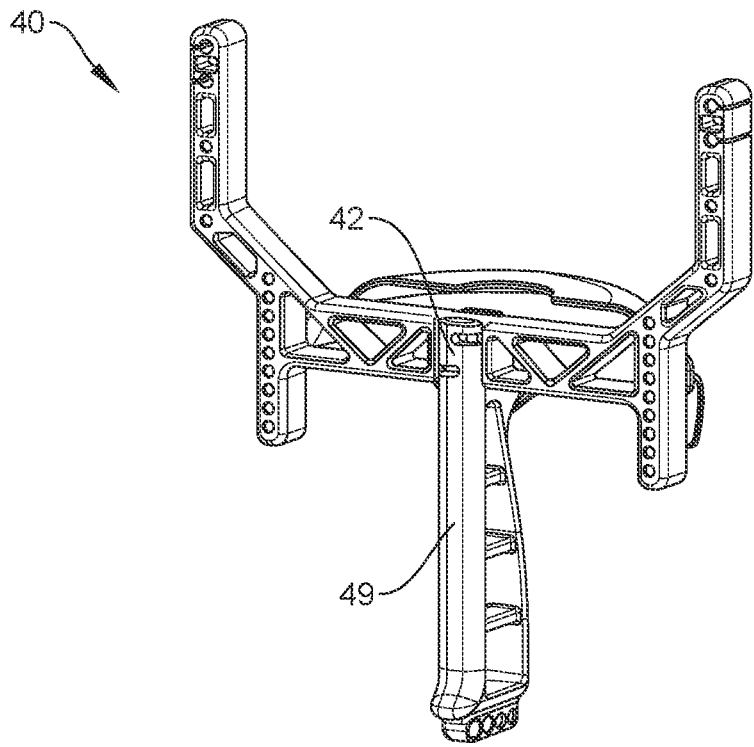
FIG. 8 is another isometric view of the structure of FIG. 7.

To help the projectile fly straight and true through the air, it is best to try to localize more weight towards the front of the projectile and less weight towards the back. Furthermore, it is best to create large fins at the rear of the projectile and smaller obstructions at the front, such that the fins can do the work of aligning the projectile in flight. Therefore, in some embodiments it is better to have a center of gravity 34 of the projectile being closer to the leading portion in comparison to the trailing portion, as best shown in FIGS. 3 and 4.

As shown herein, the entirety of the projectile is integrally formed as one part. This can be achieved using a molding operation, such as a two part mold that molds all of the features at the same time.

Furthermore, because this projectile is intended as a dog toy, it can be molded from an elastomeric polymer, thermoplastic elastomers, thermoplastic rubbers, rubbers and the like. This then allows the dog to easily grip the projectile and not damage their teeth. Also, a strong and hard rubber-like material can then better survive the abuse of a dog biting down on its structure.

The applicant made the prototype projectile of the present invention on a 3D printer using PolyFlex™ which is a family of high-quality flexible materials. PolyFlex™ provides the perfect solution for applications where high flexibility and durability are required. PolyFlex™ TPU95 is a thermoplastic polyurethane (TPU) based filament specifically engineered to work on most desktop 3D printers. In production for molding, one may use a thermoplastic elastomers (TPE), sometimes referred to as thermoplastic rubbers, which are a class of copolymers or a physical mix of polymers (usually a plastic and a rubber) that consist of materials with both thermoplastic and elastomeric properties.

Flavoring could be added to the material, but this may not be a good idea as one doesn't want the dog to destroy the projectile but instead just to retrieve it.

To aid in long flights of the projectile it cannot weigh too heavy or weigh too light. If it was too heavy, the elastic bands lack the energy to toss it very far. If it was too light, air friction quickly slows the projectile down. Therefore, as taught herein, the overall weight of the projectile should be less than 100 grams and more than 25 grams. For example, the prototypes made by the applicant weighed 50 grams and were able to achieve great performance as momentum and drag must be balanced with the power generated by the elastic band. Therefore, as another range, the projectile should weigh more than 25, 30, 35, 40 or 45 grams and weigh less than 100, 90, 80, 70 and 60 grams.

The projectile should have two hooks 25 and 26, such that an easy launch is achieved. It is possible to launch the projectile with one hook, but then requires the user to move the slingshot out of the way at the correct timing or else a strike may occur between the slingshot itself and the projectile. Again, in the applicant's experience two hooks dramatically improves the launch of the projectile.

FIGS. 7-12 show one embodiment of a slingshot 40 of the present invention that is associated with the projectile 20. The slingshot is configured to launch the projectile through the air space a distance away from the user. The slingshot comprises a handle 49 that is configured to be gripped by the user.

A pair of prongs 41 are connected and/or extending from a top 42 of the handle. The pair of prongs 41 form an opening 43 wherein the opening is at least as wide as a maximum width 35 of the projectile. At least one elastic band 36 is connected to each prong of the pair of prongs. Each of the elastic bands is releasably captured by its respective first or second hook of the projectile during launching by the user. The elastic band is typically a tubular shape that has an ability to be stretched very far thus storing a lot of energy. The elastic band can be attached to the prong by sticking the elastic band through a hole 44 in the prong and then placing a BB (such as a BB for a an air gun) inside the elastic band such that the elastic band cannot be pulled back through the hole 44 as the BB is larger than the hole 44. This is a very simple way of cheaply and easily securing the elastic band to the slingshot 40. A thin slice 45 can be formed in the side of the prong such that the elastic band can be stretched and slid in from the side.

The slingshot includes a hand guard 46 that is configured to at least partially cover a portion of a user's hand when the user is holding the handle. When in use, the hand guard is disposed between the user's hand and the projectile when the projectile is pulled back and is stretching the at least one elastic bands before being launched through the air space. If a misfire was to occur, having the projectile slam into the back of one's hand is extremely painful, as experienced firsthand by the inventor. Thus, the hand guard is a safety device that dramatically improves the enjoyment of the overall dog toy.

The hand guard is adjustably positioned to the slingshot at a multitude of locations relative to the handle configured to enable the user to maximize the amount of the user's hand being protected by the hard guard. As shown herein, there are a plurality of holes 47 that allow the hole 48 of the hand guard to be repositioned with the use of a fastener or the like, not shown. Rather than using holes, one could devise a simple snap in feature to eliminate the need for fasteners and tools.

Figure 9:
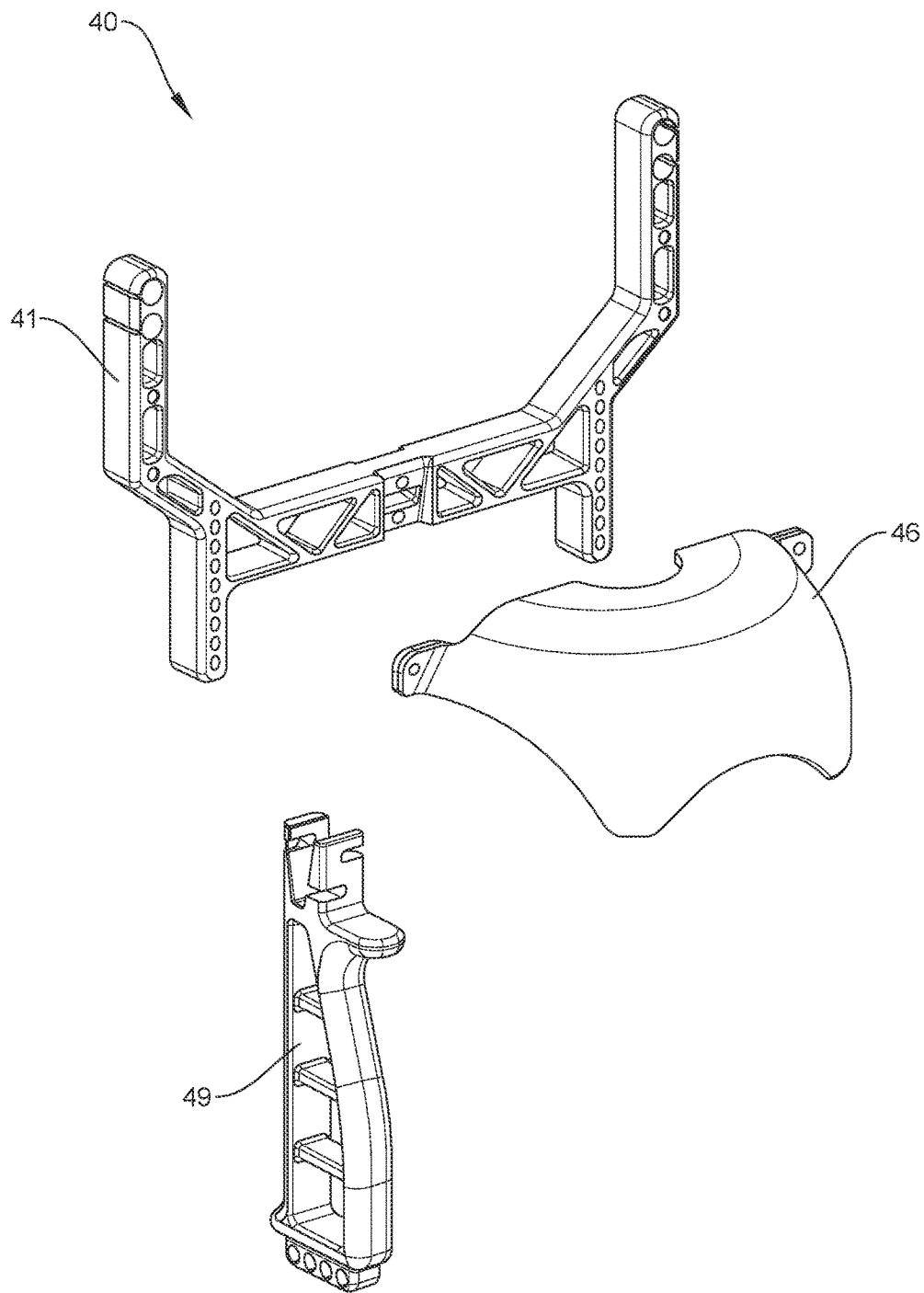
FIG. 9 is an isometric exploded view of the structure of FIG. 7.
Figure 10:
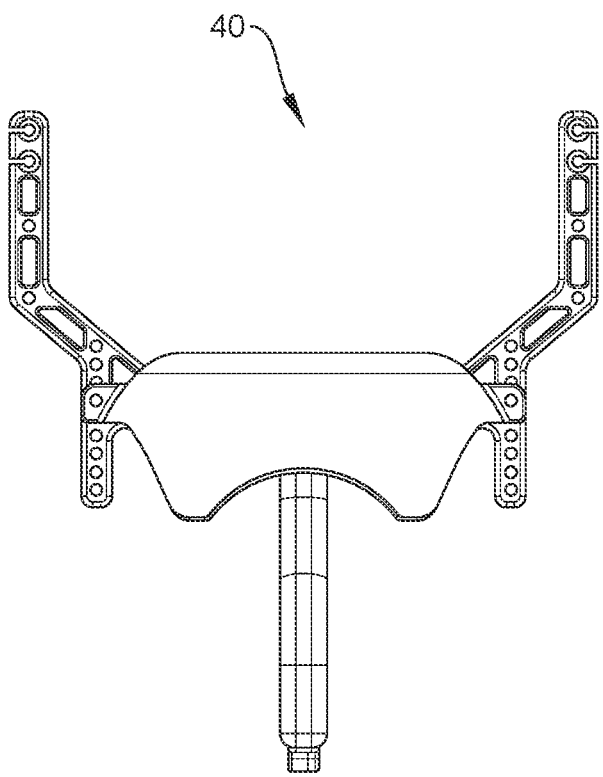
FIG. 10 is a rear view of the structure of FIG. 7.
Figure 11:
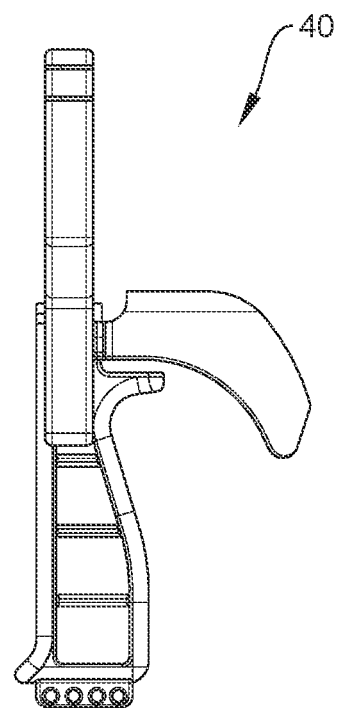
FIG. 11 is a side view of the structure of FIG. 7.
Figure 12:
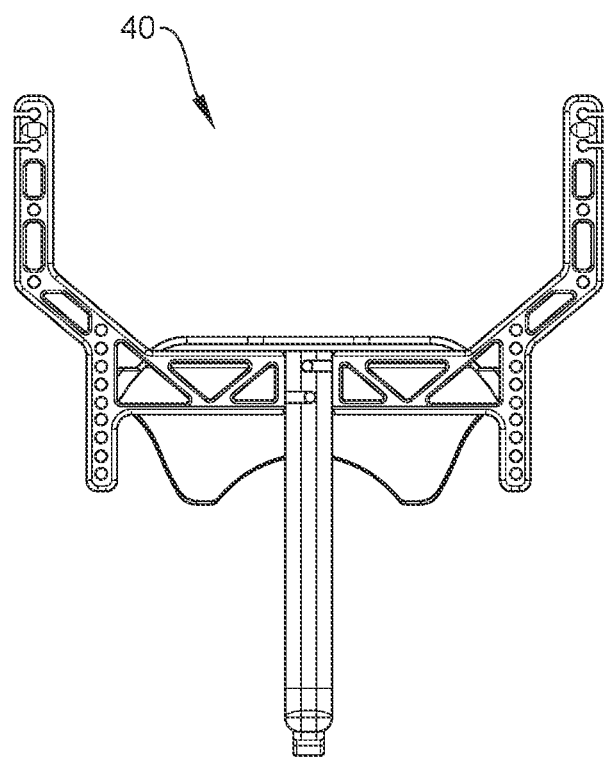
FIG. 12 is a front view of the structure of FIG. 7.

As shown in FIG. 9, the prong portion 41 was created separate from the handle portion 49. However, these structures could be made integrally as one part.

FIG. 9 shows that each part can be made with a simple two-part mold to reduce mold manufacturing costs such that no pulls or special undercuts are needed. A pull is a portion of mold that is pulled out from a two-part mold before the two mold halves are separated. Creating a pull requires maching and designing a section of the mold that slides in and out of the two part mold to help form features that the two-part is incapable of forming on its own. Likewise, the projectile 20 shown herein can be made from a two-part mold without the need for any pulls if proper draft angles are maintained.

As an alternative not shown, the slingshot may also be shaped like a dog bone to help continue the dog styling throughout the product. For example, the handle 49 may be shaped to resemble the dog bone 10 of FIG. 1. Furthermore, the handle 49 may be shaped to receive and store the projectile 20 for ease of storage and space savings.

What is claimed is:

1. A dog toy, comprising:
    a projectile comprising:
        a leading portion attached by a longitudinal extension to a trailing portion, wherein the projectile is configured to fly through an air space with the leading portion flying first and then followed by the trailing portion;
        a first hook disposed opposite a second hook about a longitudinal axis, the longitudinal axis defined along the longitudinal extension, wherein an open portion of each hook is configured to receive an elastic band within the open portion, wherein the open portion is facing open towards the trailing portion;
        a finger grip attached near, to or formed as part of the trailing portion, the finger grip configured to allow a user to grip the projectile with a user's fingers;
        wherein the projectile is dog bone shaped having a first visual pair of bulbous portions oppositely disposed at the leading portion and a second visual pair of bulbous portions oppositely disposed at the trailing portion, wherein the longitudinal extension connects the first and second visual pair of bulbous portions;
        wherein the first visual pair of bulbous portions are heavier in weight while smaller in appearance in comparison to the second visual pair of bulbous portions; and
    a slingshot associated with the projectile comprising the dog toy, the slingshot configured to launch the projectile through the air space a distance away from the user and configured to be retrieved by a dog, the slingshot comprising:
        a handle configured to be gripped by the user;
        a pair of prongs connected and/or extending from a top of the handle, wherein the pair of prongs form an opening wherein the opening is at least as wide as a maximum width of the projectile;
        at least one elastic band connected to each prong of the pair of prongs;
        wherein each at least one elastic band is releasably captured by its respective first or second hook of the projectile during launching by the user; and
        wherein the first hook and the second hook are attached to or formed as part of the first visual pair of bulbous portions.

2. The dog toy of claim 1, wherein the second visual pair of bulbous portions are formed as aerodynamic stabilization fins.

3. The dog toy of claim 2, wherein the aerodynamic stabilization fins comprise at least two fins.

4. The dog toy of claim 2, wherein the aerodynamic stabilization fins comprise at least three fins.

5. The dog toy of claim 2, wherein the aerodynamic stabilization fins comprise at least four fins.

6. The dog toy of claim 5, wherein each of the at least four fins are disposed perpendicular to their respective adjacent fins.

7. The dog toy of claim 2, wherein the aerodynamic stabilization fins comprise a twisted shape configured to induce a spin of the projectile after launching.

8. The dog toy of claim 1, wherein a center of gravity of the projectile is closer to the leading portion in comparison to the trailing portion.

9. The dog toy of claim 1, wherein the projectile is integrally formed as one part being of a same material throughout.

10. The dog toy of claim 1, wherein the projectile comprises an elastomeric polymer, a thermoplastic elastomer or a thermoplastic rubber.

11. The dog toy of claim 1, wherein an overall weight of the projectile is less than 100 grams and more than 25 grams.

12. The dog toy of claim 1, wherein the slingshot includes a hand guard configured to at least partially cover a portion of a user's hand when the user is holding the handle, the hand guard being disposed between the user's hand and the projectile when the projectile being pulled back and is stretching the at least one elastic bands before being launched through the air space.

13. The dog toy of claim 12, wherein the hand guard is adjustably positioned to the slingshot at a multitude of positions relative to the handle configured to enable the user to maximize the amount of the user's hand being protected by the hard guard.

14. The dog toy of claim 1, wherein the projectile is made from a two-part mold that does not include any pulls.

15. A dog toy, comprising:
a projectile comprising:
a leading portion attached by a longitudinal extension to a trailing portion, wherein the projectile is configured to fly through an air space with the leading portion flying first and then followed by the trailing portion;
a first hook disposed opposite a second hook about a longitudinal axis, the longitudinal axis defined along the longitudinal extension, wherein the first hook and second hook are attached near, to or formed as part of the leading portion, wherein an open portion of each hook is configured to receive an elastic band within the open portion, wherein the open portion is facing open towards the trailing portion;
a finger grip attached near, to or formed as part of the trailing portion, the finger grip configured to allow a user to grip the projectile with a user's fingers;
wherein the projectile is dog bone shaped having a first visual pair of bulbous portions disposed at the leading portion and a second visual pair of bulbous portions disposed at the trailing portion, wherein the longitudinal extension connects the first and second visual pair of bulbous portions;
wherein the first visual pair of bulbous portions oppositely disposed at the leading portion define a left side bulbous portion opposite a right side bulbous portion, wherein the first hook is formed as part of the left side bulbous portion and does not extend outwardly beyond the left side bulbous portion, and wherein the second hook is formed as part of the right side bulbous portion and does not extend outwardly beyond the right side bulbous portion, and
a slingshot associated with the projectile comprising the dog toy, the slingshot configured to launch the projectile through the air space a distance away from the user and configured to be retrieved by a dog, the slingshot comprising:
a handle configured to be gripped by the user;
a pair of prongs connected and/or extending from a top of the handle, wherein the pair of prongs form an opening wherein the opening is at least as wide as a maximum width of the projectile;
at least one elastic band connected to each prong of the pair of prongs;
wherein each at least one elastic band is releasably captured by its respective first or second hook of the projectile during launching by the user.

16. The dog toy of claim 15, wherein the first visual pair of bulbous portions are smaller in appearance and heavier in weight in comparison to the second visual pair of bulbous portions.

17. The dog toy of claim 16, wherein the second visual pair of bulbous portions are formed as aerodynamic stabilization fins, and wherein the aerodynamic stabilization fins comprise at least two fins.

18. The dog toy of claim 15, wherein the projectile is integrally formed as one part being of a same material throughout; wherein the projectile comprises an elastomeric polymer; and wherein an overall weight of the projectile is less than 100 grams and more than 25 grams.

19. A dog toy, comprising:
a projectile comprising:
a leading portion attached by a longitudinal extension to a trailing portion, wherein the projectile is configured to fly through an air space with the leading portion flying first and then followed by the trailing portion;
a first hook disposed opposite a second hook about a longitudinal axis, the longitudinal axis defined along the longitudinal extension, wherein an open portion of each hook is configured to receive an elastic band within the open portion, wherein the open portion is facing open towards the trailing portion;
a finger grip attached near, to or formed as part of the trailing portion, the finger grip configured to allow a user to grip the projectile with a user's fingers;
wherein the projectile is dog bone shaped having a first visual pair of bulbous portions oppositely disposed at the leading portion and a second visual pair of bulbous portions oppositely disposed at the trailing portion, wherein the longitudinal extension connects the first and second visual pair of bulbous portions;
wherein the first visual pair of bulbous portions are heavier in weight in comparison to the second visual pair of bulbous portions;
wherein the first visual pair of bulbous portions define a first outside profile taken from a first side view perpendicular to the first visual pair of bulbous portions,
wherein the second visual pair of bulbous portions define a second outside profile taken from a second side view perpendicular to the second visual pair of bulbous portions;
wherein the first outside profile is smaller in comparison to the second outside profile; and
a slingshot associated with the projectile comprising the dog toy, the slingshot configured to launch the projectile through the air space a distance away from the user and configured to be retrieved by a dog, the slingshot comprising:
a handle configured to be gripped by the user;
a pair of prongs connected and/or extending from a top of the handle, wherein the pair of prongs form an opening wherein the opening is at least as wide as a maximum width of the projectile;
at least one elastic band connected to each prong of the pair of prongs;
wherein each at least one elastic band is releasably captured by its respective first or second hook of the projectile during launching by the user; and
wherein the first hook and the second hook are attached to or formed as part of the first visual pair of bulbous portions.

* * * * *